United States Patent
Spaven et al.

(10) Patent No.: US 11,509,253 B2
(45) Date of Patent: Nov. 22, 2022

(54) ELECTRIC DRIVE ASSEMBLY WITH DYNAMIC CONTROL OF PULSE WIDTH MODULATION SWITCHING

(71) Applicant: GM GLOBAL TECHNOLOGY OPERATIONS LLC, Detroit, MI (US)

(72) Inventors: Kerrie M. Spaven, Rochester Hills, MI (US); Brent S. Gagas, Pleasant Ridge, MI (US); Brian A. Welchko, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 86 days.

(21) Appl. No.: 17/185,365

(22) Filed: Feb. 25, 2021

(65) Prior Publication Data

US 2022/0271697 A1    Aug. 25, 2022

(51) Int. Cl.
*H02P 27/08*    (2006.01)
*B60L 15/20*    (2006.01)
*H02P 27/14*    (2006.01)

(52) U.S. Cl.
CPC ............ *H02P 27/085* (2013.01); *B60L 15/20* (2013.01); *H02P 27/14* (2013.01)

(58) Field of Classification Search
CPC ......... H02P 27/085; H02P 27/14; B60L 15/20
See application file for complete search history.

(56) References Cited

U.S. PATENT DOCUMENTS

| | | | |
|---|---|---|---|
| 2017/0353111 A1* | 12/2017 | Elasser | H02M 3/33507 |
| 2018/0278178 A1* | 9/2018 | Saha | H02M 7/5387 |
| 2019/0366854 A1* | 12/2019 | Sun | B60L 15/08 |

* cited by examiner

*Primary Examiner* — Rina I Duda
(74) *Attorney, Agent, or Firm* — Quinn IP Law

(57) ABSTRACT

An electric drive system includes a rechargeable energy storage unit, a power inverter, an electric motor and a controller having a processor and tangible, non-transitory memory on which instructions are recorded. A transfer of electrical power between the rechargeable energy storage unit and the electric motor is governed by a pulse width modulation (PWM) switching frequency. The controller is configured to determine a current switching frequency based in part on a PWM type, a PWM switching frequency style and an inverter direct current voltage. A PWM scalar is determined based in part on the current switching frequency and a maximum value of a control reference frequency. The controller is configured to transmit a command signal to regulate the transfer of electrical power based in part on the PWM scalar, the PWM switching frequency being proportional to a product of the PWM scalar and the control reference frequency.

20 Claims, 6 Drawing Sheets

ELECTRIC DRIVE ASSEMBLY WITH DYNAMIC CONTROL OF PULSE WIDTH MODULATION SWITCHING

INTRODUCTION

The present disclosure relates generally to control of pulse width modulation switching in an electric drive system and an electric vehicle incorporating the same. The use of purely electric vehicles and hybrid electric vehicles, such as for example, battery electric vehicles, extended-range electric vehicles, plug-in hybrid electric vehicles and fuel cell hybrid electric vehicles, has increased over the last few years. Many electric vehicles employ a rechargeable traction battery pack to store and supply the requisite power for operating one or more traction motors in the vehicle powertrain. Operation and control of each traction motor, which may be in the nature of a polyphase alternating current (AC) motor generator unit, may be accomplished by employing a power inverter module to transform battery-generated direct current (DC) power to motor-driving AC power using pulse-width modulated (PWM) control signals outputted from a control unit in the electric vehicle. Motor windings of each polyphase AC motor generator unit may be coupled to inverter sub-modules of the power inverter module, each of which employs a pair of switches that open and close in a complementary manner to perform a fast-switching function to convert DC power to AC power, and vice versa.

SUMMARY

Disclosed herein is an electric drive system including a rechargeable energy storage unit, a power inverter operatively connected to the rechargeable energy storage unit and an electric motor operatively connected to the power inverter. A controller is in communication with the power inverter. Transfer of electrical power between the rechargeable energy storage unit and the electric motor is governed by a pulse width modulation (PWM) switching frequency. The controller has a processor and tangible, non-transitory memory on which instructions are recorded.

Execution of the instructions by the processor causes the controller to determine a current switching frequency based in part on a PWM type, a PWM switching frequency style and an inverter direct current voltage. A PWM scalar is determined based in part on the current switching frequency and a maximum value of a control reference frequency. Operation of the controller is at least partially defined by the control reference frequency. The controller is configured to transmit a command signal to regulate the transfer of electrical power based in part on the PWM scalar. The PWM switching frequency is proportional to a product of the PWM scalar and the control reference frequency.

The current switching frequency may be based in part on an inverter coolant temperature and whether a motoring torque or a regenerative torque is in operation. The instructions may be executed dynamically such that the PWM scalar varies over time. Obtaining the PWM scalar may include obtaining an expanded PWM switching frequency as a sum of the current switching frequency and a frequency span. A ratio of the expanded PWM switching frequency is obtained by dividing by the maximum value of the control reference frequency. The PWM scalar is set as a smallest integer greater than or equal to the ratio such that the PWM scalar equals CEILING (Ratio).

Determining the current switching frequency may include determining a PWM region layout having multiple PWM regions arranged in a torque-speed curve calibrated to the electric motor, via the controller. A designated PWM region is obtained from the PWM region layout in the torque-speed curve, based on a speed and a torque of the electric motor, via the controller, the speed and the torque of the electric motor being based in part on a torque command. Determining the current switching frequency may include selecting the PWM type as a function of the designated PWM region, via the controller and selecting the PWM switching frequency style as a function of the designated PWM region, via the controller.

The PWM switching frequency style may be selected from a predefined list of PWM switching frequency styles, the predefined list of PWM switching frequency styles including a constant pulse ratio switching style a constant switching frequency switching style and a lookup table (LUT) with an array of selectable switching frequencies. The PWM type may be selected from a predefined list of PWM types, the predefined list of PWM types including a discontinuous PWM (DPWM) technique, a zero-vector modulation (ZVM) technique, and a space vector pulse width modulation (SVPWM) technique. When the PWM type is a space vector pulse width modulation (SVPWM) technique and the current switching frequency is greater than a threshold SVPWM switching frequency, the controller may be programmed to set the current switching frequency to the threshold SVPWM switching frequency prior to updating a the PWM type to the SVPWM technique.

When the PWM type is a discontinuous PWM (DPWM) technique, the controller may be programmed to prevent switching from the DPWM technique to a space vector pulse width modulation (SVPWM) technique until the current switching frequency is below a threshold SVPWM switching frequency. The controller may be programmed to override the control reference frequency and the PWM switching frequency when a six-step operation is active. The controller may be programmed to incorporate a hysteresis band at a maximum value of the control reference frequency.

Disclosed herein is a method of operating an electric drive system having a rechargeable energy storage unit, an electric motor, a power inverter, and a controller with a processor and tangible, non-transitory memory. The method includes regulating a transfer of electrical power between the rechargeable energy storage unit and the electric motor by a pulse width modulation (PWM) switching frequency, via the power inverter. A current switching frequency is determined based in part on a PWM type, a PWM switching frequency style and an inverter direct current voltage, via the controller, operation of the controller being at least partially defined by a control reference frequency. A PWM scalar is obtained based in part on the current switching frequency and a maximum value of the control reference frequency, via the controller. The method includes transmitting a command signal to the power inverter to regulate the transfer of electrical power based in part on the PWM scalar, the PWM switching frequency being proportional to a product of the PWM scalar and the control reference frequency, via the controller.

When the PWM type is the DPWM technique, the method may include preventing switching from the DPWM technique to the SVPWM technique until the current switching frequency is below a predefined threshold. A hysteresis band may be applied to the current switching frequency, the hysteresis band extending to a maximum value of the control reference frequency.

Disclosed herein is an electric vehicle having a traction motor adapted to output torque for propulsion, a traction battery pack adapted to power the traction motor and a power inverter electrically connecting the traction battery pack to the traction motor. A controller is in communication with the power inverter, operation of the controller being defined by a control reference frequency. The power inverter is operable to convert direct current power output by the traction battery pack to alternative current power and transfer the alternative current power to the traction motor, based in part on a pulse width modulation (PWM) switching frequency. The controller has a processor and tangible, non-transitory memory on which instructions are recorded, execution of the instructions by the processor causing the controller to determine a current switching frequency based in part on a PWM type, a PWM switching frequency style and an inverter direct current voltage. A PWM scalar is obtained based in part on the current switching frequency and a maximum value of the control reference frequency. The controller is configured to transmit a command signal to the power inverter to regulate a transfer of electrical power based in part on the PWM scalar, the PWM switching frequency being proportional to a product of the PWM scalar and the control reference frequency.

The above features and advantages and other features and advantages of the present disclosure are readily apparent from the following detailed description of the best modes for carrying out the disclosure when taken in connection with the accompanying drawings.

Figure 1:
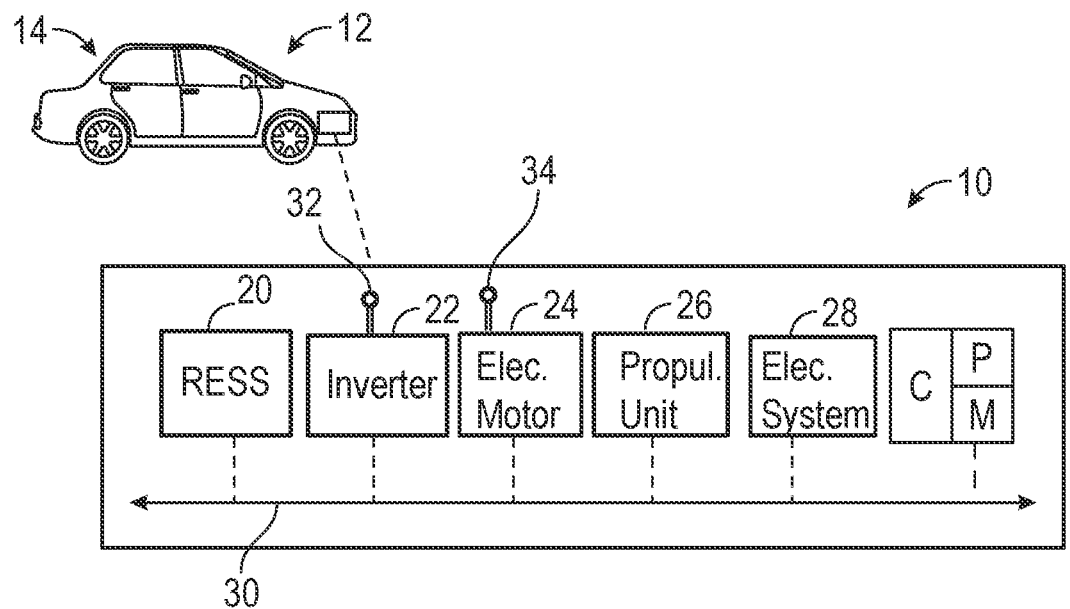
FIG. 1 is a schematic fragmentary diagram of an electric drive system having an electric motor, a power inverter and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an electric drive system 10. The electric drive system 10 may be located in a device 12. The device 12 may be an electric vehicle 14, which may be purely electric or hybrid/partially electric. The device 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane and train. The device 12 may include manufacturing equipment and other electrical equipment. It is to be understood that the device 12 may take many different forms and have additional components.

Referring to FIG. 1, the electric drive system 10 includes a DC power source such as a rechargeable energy storage unit 20. The electric drive system 10 includes a power inverter 22 and an electric motor 24. The rechargeable energy storage unit 20 may be a traction battery pack for generating high-voltage power that may be directed to a propulsion unit 26, via the electric motor 24, and for operating other electrical systems 28 in the device 12. The rechargeable energy storage unit 20 may include battery cells of different chemistries. In one example, the power inverter 22 is a three-phase three-wire voltage-source inverter. In some embodiments, the power inverter 22 may be a TPIM unit of the electric vehicle 14. In order to generate tractive power with sufficient vehicle range and speed, the rechargeable energy storage unit 20 in the electric vehicle 14 may be larger and higher in capacity than a standard 12-volt starting, lighting, and ignition battery. In such an instance, the electric drive system 10 is a high-voltage electric drive system 10.

Referring to FIG. 1, the electric drive system 10 includes a controller C adapted to regulate the operation of various onboard systems and components in the device 12. For example, the controller C may be an electronic control unit (ECU) of the electric vehicle 14. The controller C is communicatively connected with the electric motor 24 to control, for example, bi-directional transfer of energy between the rechargeable energy storage unit 20 and the electric motor 24. The electric motor 24 may operate using a three-phase AC current. In such an instance, the power inverter 22 is governed by the controller C to convert the DC voltage (provided by the rechargeable energy storage unit 20) to a three-phase AC voltage for use by the electric motor 24. In a regenerative mode, in which the electric motor 16 is configured as a motor/generator, the power inverter 22 converts AC power from the electric motor 24 to DC power compatible with the rechargeable energy storage unit 20. It is understood that the electric drive system 10 may include additional components not shown.

Referring to FIG. 1, the various components of the electric drive system 10 may be in communication with the controller C (and each other) via a wireless network 30, which may be a short-range network or a long-range network. Additionally, the various components of the electric drive system 10 may include physical wired connections. The wireless network 30 may be a communication BUS, which may be in the form of a serial Controller Area Network (CAN-BUS). The wireless network 30 may be incorporate a Bluetooth connection, a Wireless Local Area Network (LAN) which links multiple devices using a wireless distribution method, a Wireless Metropolitan Area Networks (MAN) which connects several wireless LANs or a Wireless Wide Area Network (WAN). Other types of connections may be employed.

The controller C is programmed to receive a torque command in response to an operator input (e.g., through an accelerator pedal or brake pedal) or an automatically fed input condition monitored by the controller C. Upon receipt of the torque command, the controller C is programmed to transmit a command signal to the power inverter 22 to regulate a transfer of electrical power between the rechargeable energy storage unit 20 and the electric motor 24. One technique employed to obtain a variable frequency, variable voltage or variable power from a power inverter 22 operating from a fixed voltage DC power, such as the rechargeable energy storage unit 20 is the pulse width modulation ("PWM" hereinafter) technique. The "switching frequency" of the PWM signal determines how fast the PWM completes a cycle (i.e., 500 Hz would be 500 cycles per second), and therefore how fast it switches between high and low states. In other words, the PWM switching frequency corresponds to the rate at which the DC voltage is switched on and off during the PWM process in a switching power supply. There are various PWM techniques which may be implemented, such as for example, sinusoidal PWM (SPWM), space vector PWM (SVPWM), zero-vector modulation (ZVM) and discontinuous PWM (DPWM). These techniques differ in terms of their voltage linearity range, ripple voltage/current, switching losses, and high frequency common mode voltage or current properties.

Figure 2:
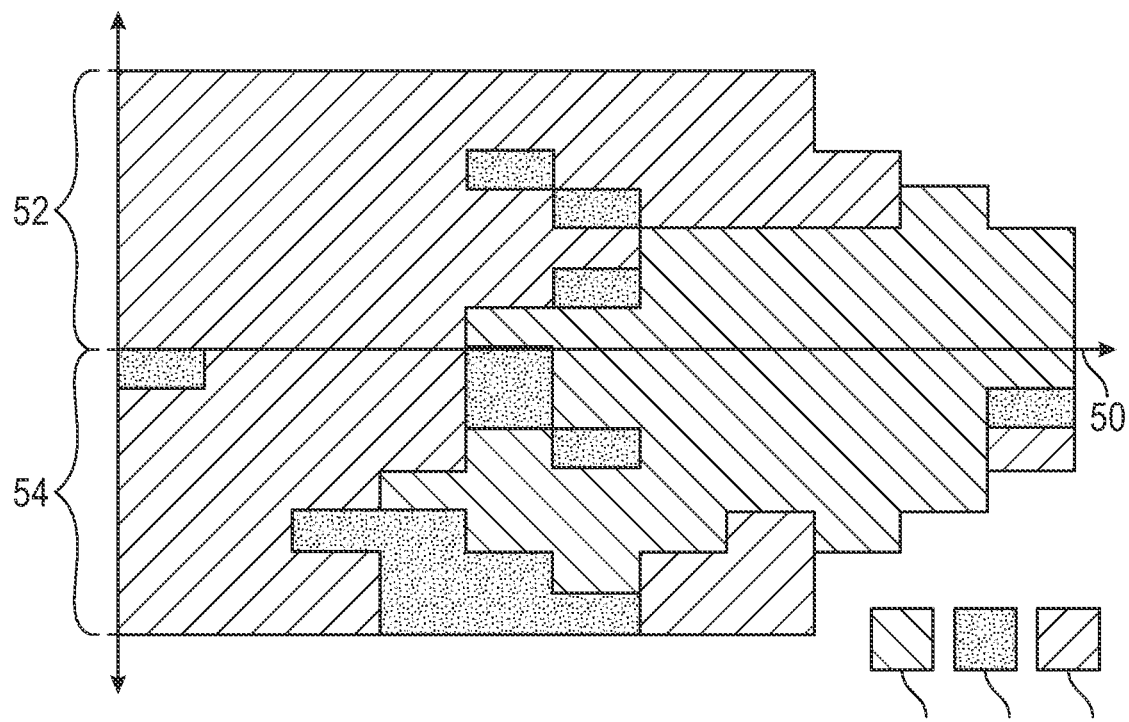
FIG. 2 illustrates switching frequency regions for an example electric motor, with motoring torque and regenerative torque on the vertical axis, and electric motor speed on the horizontal axis.

Referring now to FIG. 2, an example graph is shown of various switching frequencies that may be employed at different combinations of speed and torque of an example electric motor 24. The horizontal axis 50 of FIG. 2 indicates the electric motor speed. The first portion 52 of the vertical axis corresponds to a motoring mode (or motoring torque) while the second portion 54 of the vertical axis corresponds to a regenerative mode. The first region 56 of FIG. 2 represents a first switching frequency, the second region 58 represents a second switching frequency and the third region 60 represents a third switching frequency. In one example, the first switching frequency, the second switching frequency and the third switching frequency are 10, 15, and 20 kiloHertz (kHz), respectively.

Referring to FIG. 1, the controller C includes at least one processor P and at least one memory M (or non-transitory, tangible computer readable storage medium) on which are recorded instructions for executing a method 100 of operating the electric drive system 10. Method 100 is described below with respect to FIGS. 3-6. The memory M can store controller-executable instruction sets, and the processor P can execute the controller-executable instruction sets stored in the memory M.

Operation of the controller C is at least partially defined by a closed-loop control reference frequency, referred to herein as control reference frequency. The control reference frequency (sometimes referred to as "Task0" frequency) is limited by the throughput and other capabilities (e.g., processing) of the controller C and its component parts. The control reference frequency may be the frequency at which input variables are sampled. The controller C of FIG. 1 is specifically programmed to execute the blocks of the method 100 (as discussed in detail below with respect to FIGS. 3-6) and can receive inputs from various sensors, each capable of measuring a respective physical factor and sending a respective signal to the controller C. For example, referring to FIG. 1, the electric drive system 10 may include a temperature sensor 32 for determining an inverter coolant temperature (Tw) and a motor speed sensor 34 for determining motor speed. Additionally, controller C may be programmed to determine the respective physical factors by modeling or other estimation technique available to those skilled in the art. It is to be understood that portions of method 100 may be operated at slower rates than the control reference frequency. For example, the temperature sensor 32 may read at a slower rate to free up processor resources since they change slowly while the motor speed/position sensor may continue to be read at the faster rate.

The method 100 improves the range and functioning of the electric vehicle 14 by increasing the span of the PWM Switching Frequency. The increased span is achieved by dynamically changing a PWM scalar, which allows for a higher PWM switching frequency. The PWM scalar is the number of PWM periods per reference period or control cycle of the controller C, which as can be seen from the equation below. Additionally, current ripple is reduced at higher switching frequencies.

PWM Switching Frequency=PWM Scalar*Control Reference Frequency

Figure 3:
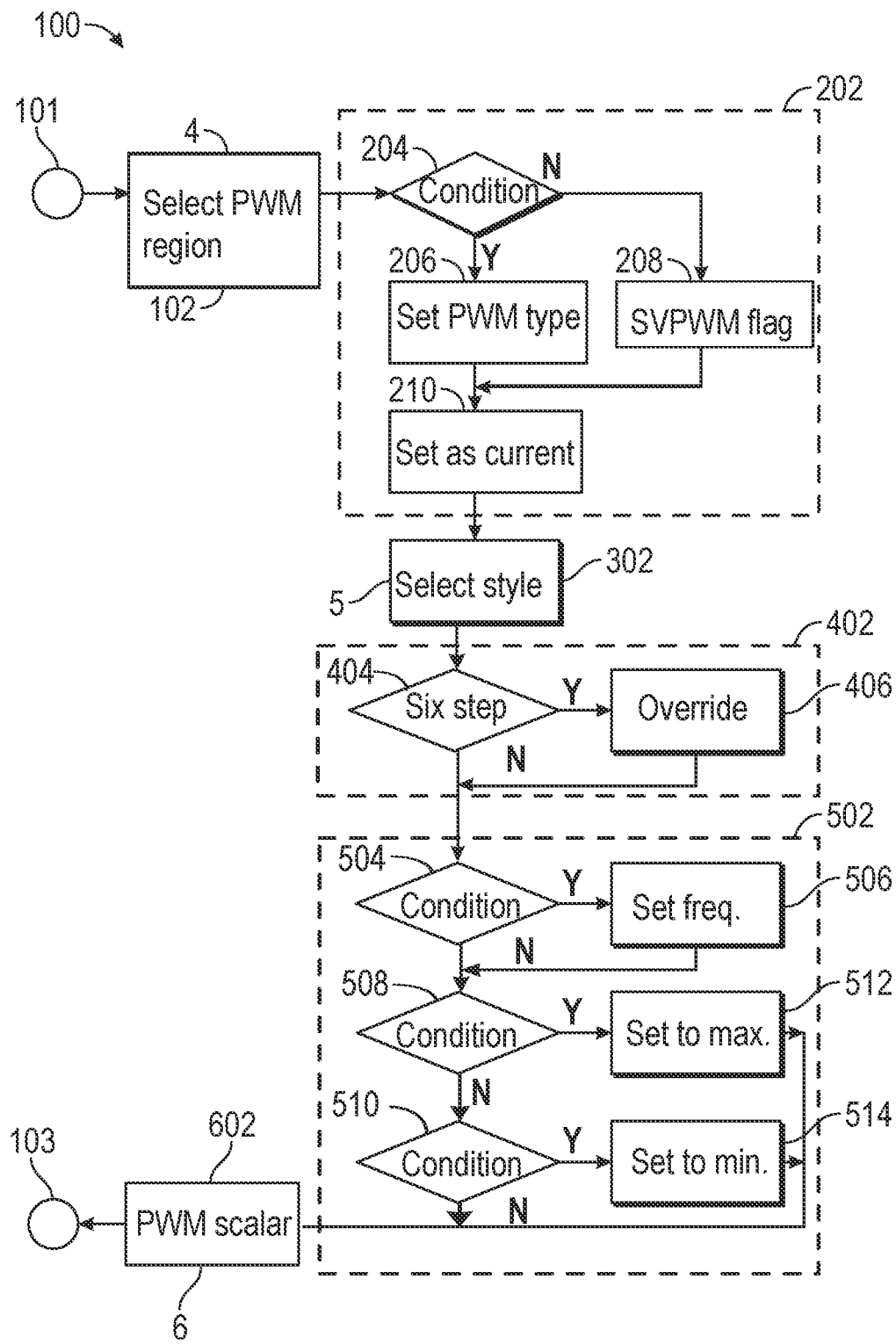
FIG. 3 is a flowchart for a method of operating the electric drive system of FIG. 1.

Referring now to FIG. 3, a flowchart of the method 100 is shown. Method 100 may be embodied as computer-readable code or instructions stored on and partially executable by the controller C of FIG. 1. Method may be executed in real-time, continuously, systematically, sporadically and/or at regular intervals, for example, each 10 milliseconds during normal and ongoing operation of the electric vehicle 14.

Method 100 of FIG. 3 begins at block 101, ends at block 103 and includes sub-routines or modules 102, 202, 302, 402, 502 and 602. Method 100 need not be applied in the specific order recited herein. Furthermore, it is to be understood that some modules (or some blocks within the modules) may be eliminated.

Figure 7A:
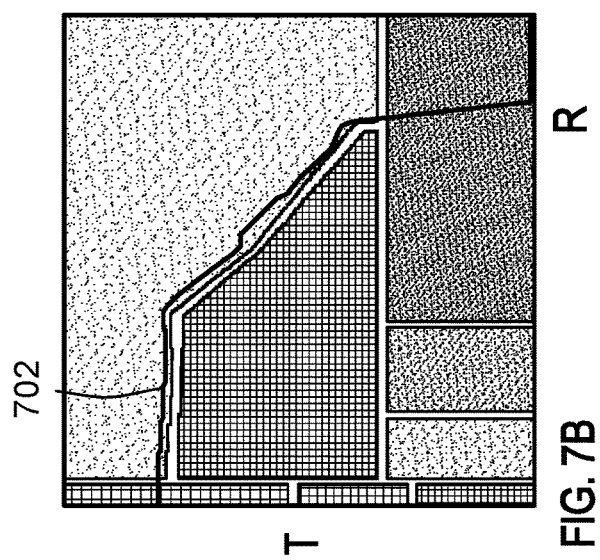
FIGS. 7A to 7C are example representative PWM region layouts arranged within a torque-speed curve of motor speed (R) vs. motor torque (T), calibrated for an example electric motor and power inverter of an electric vehicle, for determining a coolant-temperature based PWM region layout.
Figure 7B:
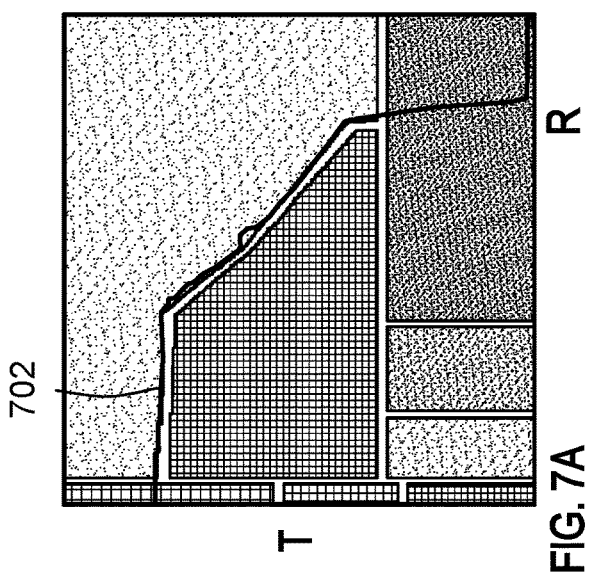
Figure 7C:
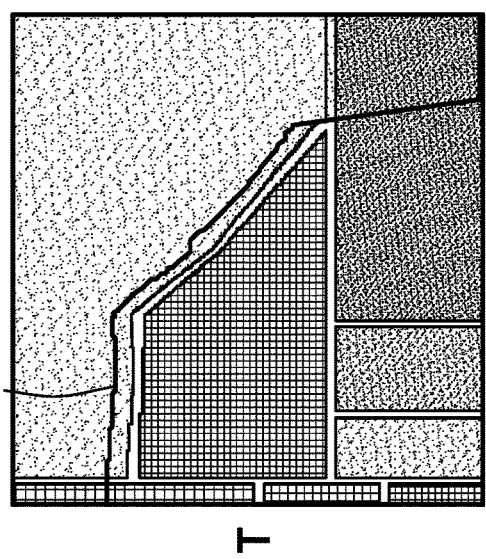

As will be described below, module 102 includes choosing an optimal PWM region. FIGS. 7A to 7C, for example, illustrate three representative PWM region layouts—a low-temperature PWM region definition (FIG. 7A), a blended PWM region definition (FIG. 7B), and a high-temperature PWM region definition (FIG. 7C)—for a torque-speed curve 702 of an example electric motor. FIGS. 7A to 7C show motor speed (R) in revolutions per minute on the X-axis versus motor torque (T) on the Y-axis. The torque-speed curve 702 (which is the same in FIGS. 7A, 7B and 7C) may be derived through a direct-connect dyno or a chassis dyno. In general, a torque-speed curve originates at a crossing point on the Y-axis where torque is at a maximum and speed is zero. This crossing point is the "stall torque" of the electric machine, namely the maximum motor torque available when the motor is running at zero speed. The torque-speed curve slopes downward until it intersects the X-axis at a point of zero torque and maximum speed. FIGS. 7A-7C depict the 'motoring' region of operation where both torque and speed are positive; disclosed methods, however, are equally applicable to the remaining regenerative region (not depicted) along both the negative motoring and negative region.

Figure 8A:
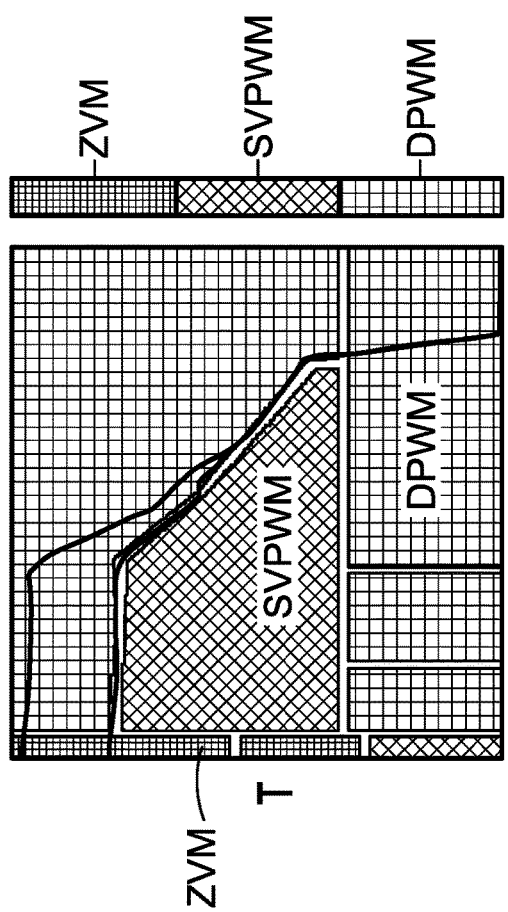
FIGS. 8A to 8D illustrate a selected one of the PWM region layouts within the torque-speed curve from FIGS. 7A-7C for determining a PWM region (FIG. 7A), a PWM type (FIG. 7B), a switching frequency style (FIG. 7C), and a switching frequency (FIG. 7D), in accordance with some embodiments of the disclosure.
Figure 8C:
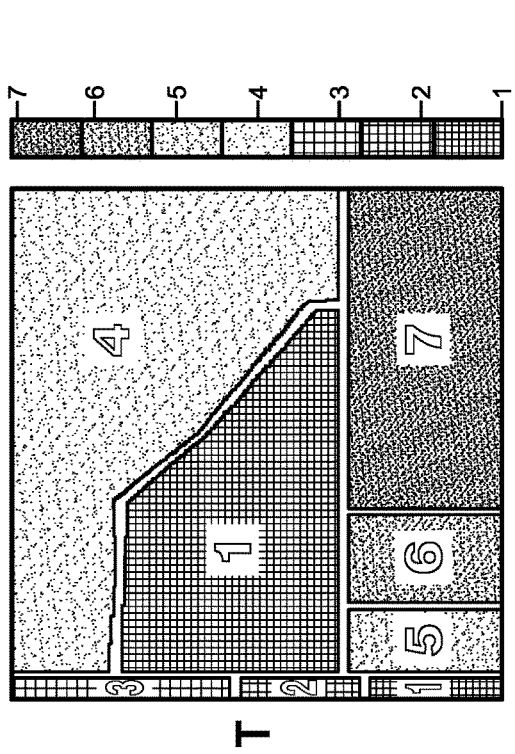
Figure 8B:
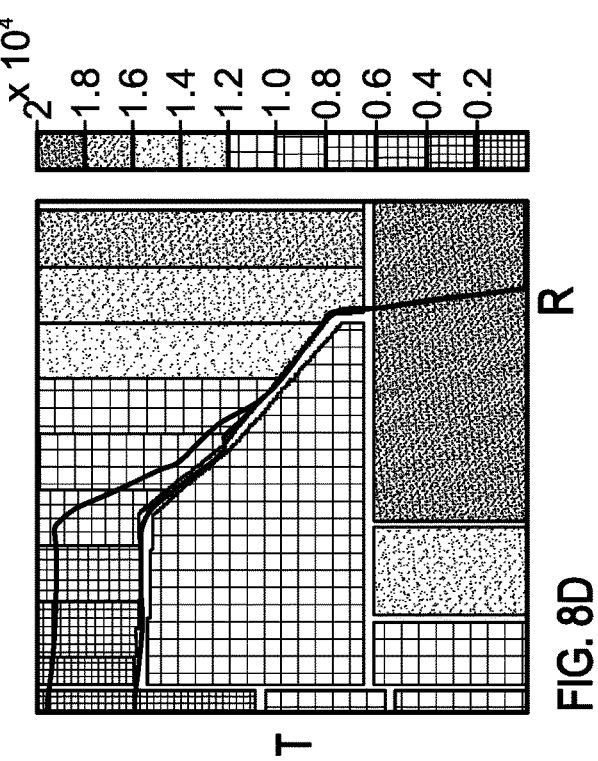

Module 102 further includes choosing a PWM type as a function of the chosen PWM region. FIG. 8B illustrates three example PWM schemes that may be available for selection: a discontinuous PWM (DPWM) technique, a zero-vector modulation (ZVM) technique, and continuous PWM (CPWM) technique, such as space-vector PWM (SVPWM). Each of the PWM regions (1) through (7) of FIG. 8A is assigned to one of the available PWM types presented in FIG. 8B. Drawing on an example from the illustrated plots, PWM region six (6) may be selected from the PWM region layout of FIG. 8A for a corresponding motor torque and speed falling within that region; as seen in FIG. 8B, PWM region six (6) is assigned to execute a DPWM technique. While three examples of selectable PWM schemes are described herein, it is understood that the method 100 may employ greater or fewer than three PWM types, which may include additional or alternative PWM principles.

As will be described below, module 302 includes selecting a PWM switching frequency style and determining a PWM switching frequency (as a function of the PWM region and PWM type chosen in module 102). Module 402 pertains to a six-step reference frequency over-ride mechanism. Modules 202 and 502 provide a number of frequency-limiting mechanisms for hardware protection. Finally, module 602 pertains to calculation of the PWM scalar using an expanded value of the PWM switching frequency, the expanded value including a frequency span from dither (to avoid toggling) and incorporation of a hysteresis band at a maximum value of the control reference frequency.

Figure 4:
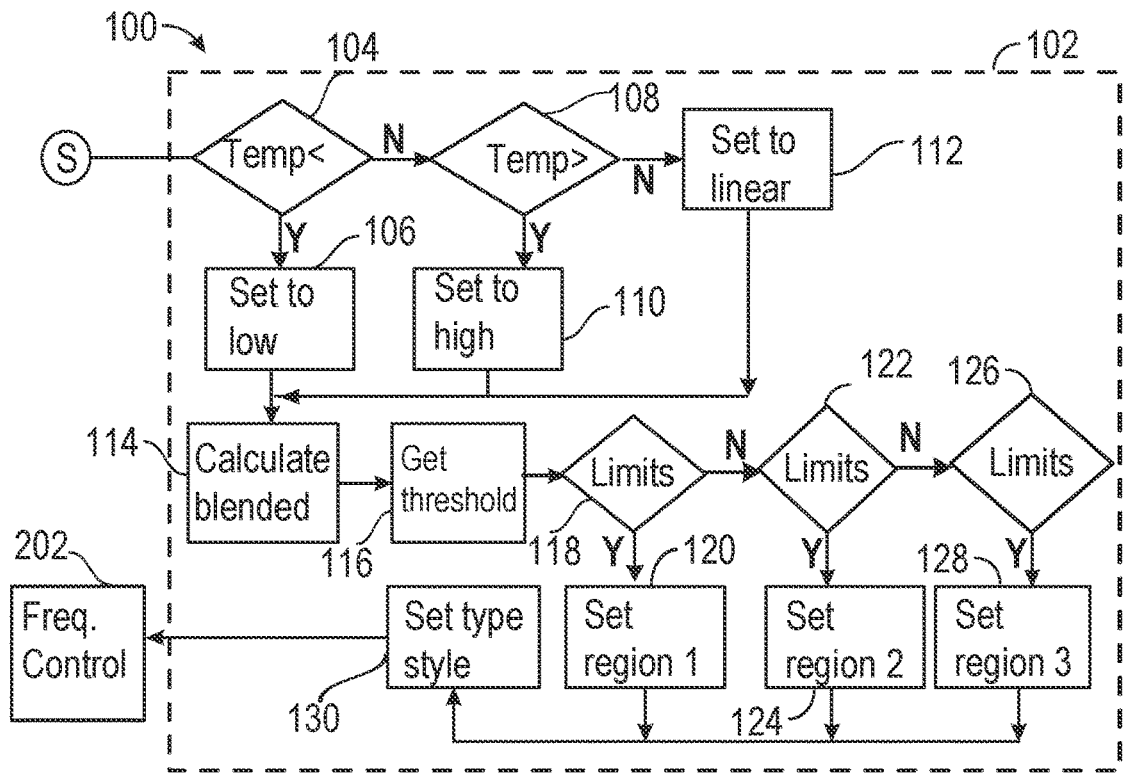
FIG. 4 is a flowchart showing in detail a portion of the method of FIG. 3.

Referring now to FIG. 4, where module 102 is shown in detail, module 102 begins at decision block 104 with determining whether or not an inverter coolant temperature (Tw) is less than a first (low) threshold coolant temperature. If it is (block 104=YES), module 102 advances to process block 106 and sets the PWM region layout to the low-coolant-temp PWM region layout (e.g., see FIG. 7A). If the inverter coolant temperature is greater than the first (low) threshold coolant temperature (block 104=NO), module 102 advances to decision block 108 of FIG. 4 and ascertains whether or not the inverter coolant temperature (Tw) is greater than a second (high) threshold coolant temperature. If so (block 108=YES), module 102 advances to process block 110 and sets the PWM region layout to the high-coolant-temp PWM region layout (e.g., see FIG. 7C). If the coolant temperature (Tw) is both greater than the low threshold coolant temperature and less than the high threshold coolant temperature (block 108=NO), module 102 executes the control operations of process block 112 and sets the PWM region layout to a linear blend region layout (e.g., see FIG. 7B).

The PWM region definition plots may be defined through calibration for low and high inverter coolant temperatures. To avoid predefining a large number of PWM region definition plots for various temperatures between the high and low temperatures, thus reducing the requisite memory storage space for the plots, an "in process" estimation procedure may be carried to linearly interpolate between the high and low region definition plots to estimate a new torque-speed based PWM region plot definition for a present "midrange" coolant temperature. It should be understood that the blended PWM region definition of FIG. 7B is an example at one temperature between the low-temperature PWM region definition (FIG. 7A) and the high-temperature PWM region definition (FIG. 7C); at a different temperature between the upper and lower temperature thresholds, the region definition will vary.

Module 102 advances from process blocks 106, 110 and 112 to process block 114. Per process block 114 of FIG. 4, the controller C is adapted to calculate a blended torque-speed region corresponding to the present inverter coolant temperature based on the coolant temperature and a mechanical power state, which may be positive for motoring and negative for regenerative braking. A regenerative flag (in the form of a software flag) may be employed to indicate that the electric vehicle 14 is presently operating in a regenerative braking mode rather than a motoring mode. In this regard, the PWM region definition plot, PWM type, and PWM switching frequency usage/selection may be different based on whether the electric vehicle 14 is operating in a motoring or regenerative mode. Hence, module 102 may define distinct plots for motoring mode and distinct plots for regenerative mode.

Module 102 continues at process block 116 of FIG. 4 and determines a respective first (upper) torque threshold and a respective second (lower) torque threshold for each of the PWM regions at a present motor speed (absolute value) based on the chosen coolant-temp-based PWM region layout and the present operating mode of the electric drive system 10 (e.g., motoring vs. regenerative in an automotive application). For example, the controller C of FIG. 1 may prompt the motor speed sensor 34 for sensor data indicative of a real-time motor speed. Using this information, the controller C may determine a set of torque limits at the current motor speed for each region (1) through (7) of FIG. 8A. By way of non-limiting examples, the first (upper) torque threshold may be approximately 0.4 per unit and the second (lower) threshold may be approximately zero (0) per unit at very low speed operating point. By comparison, region (1) may have a first (upper) torque threshold of approximately 0.95 per unit and a second (lower) threshold of approximately 0.45 per unit at medium speed operating point.

After determining the torque limits for each PWM region in process block 116, module 102 proceeds to decision block 118. Per decision block 118 of FIG. 2, the controller C is adapted to determine whether or not the motor torque ($T_{rq}$) is within the torque limits of the first region: (1) is $T_{rq}$>Region 1 lower torque threshold; and (2) is $T_{rq}$<Region 1 upper torque threshold. If it is (block 118=YES), module 102 advances to process block 120 and sets the PWM region to PWM region (1). If the motor torque is outside the torque limits of the first region (block 118=NO), module 102 moves to decision block 122 and determines whether or not the motor torque ($T_{rq}$) is within the torque limits of the second region: (1) is $T_{rq}$>Region 2 lower torque threshold; and (2) is $T_{rq}$<Region 2 upper torque threshold. If so (block 122=YES), module 102 proceeds to process block 124 and sets the PWM region to the PWM region (2) (FIG. 7A). If, however, the motor torque is outside the torque limits of the second region (block 122=NO), the controller C proceeds to decision block 126 and process block 128 and repeats the inquiries described above for each of the remaining PWM regions until the corresponding region is identified.

Referring to FIG. 4, module 102 advances to process block 130 from process blocks 120, 124 and 128. Process block 130 of FIG. 4 includes setting the PWM type and the PWM frequency style as a function of the identified or selected PWM torque-speed region. Method 100 of FIG. 3 then transitions from module 102 to module 202.

Module 202 is shown in detail in FIG. 3 and pertains to a first set of frequency controls or limitations. Module 202 begins with decision block 204 where the controller C is configured to determine whether (1) the PWM type is SVPWM; and (2) the PWM switching frequency is greater than a threshold maximum PWM switching frequency for the SVPWM technique. If both of these are true (Block 204=YES), module 102 advances to process block 206, where the PWM type is set as the PWM type determined in the previous control iteration and the SVPWM request flag is set as true. If not (Block 204=NO), module 102 advances to process block 208 where the SVPWM request flag is set to false. If Block 204=NO, then a SVPWM request flag is set to False and a "determine PWM_type" request is sent through (which may be any of the PWM types, including SVPWM). Block 204 may include checking to see if the switching frequency is currently too high to use SVPWM. If so, the controller C may be programmed not to switch to SVPWM until the switching frequency is within a predefined threshold. In this case, the previous PWM type will be continued and a flag is sent to say that SVPWM is being requested Module 202 proceeds to process block 210 (from process blocks 206 and 208) where the previous PWM type is set to be the current PWM type for use in the subsequent control iteration. Method 100 of FIG. 3 then transitions from module 202 to module 302.

Figure 5:
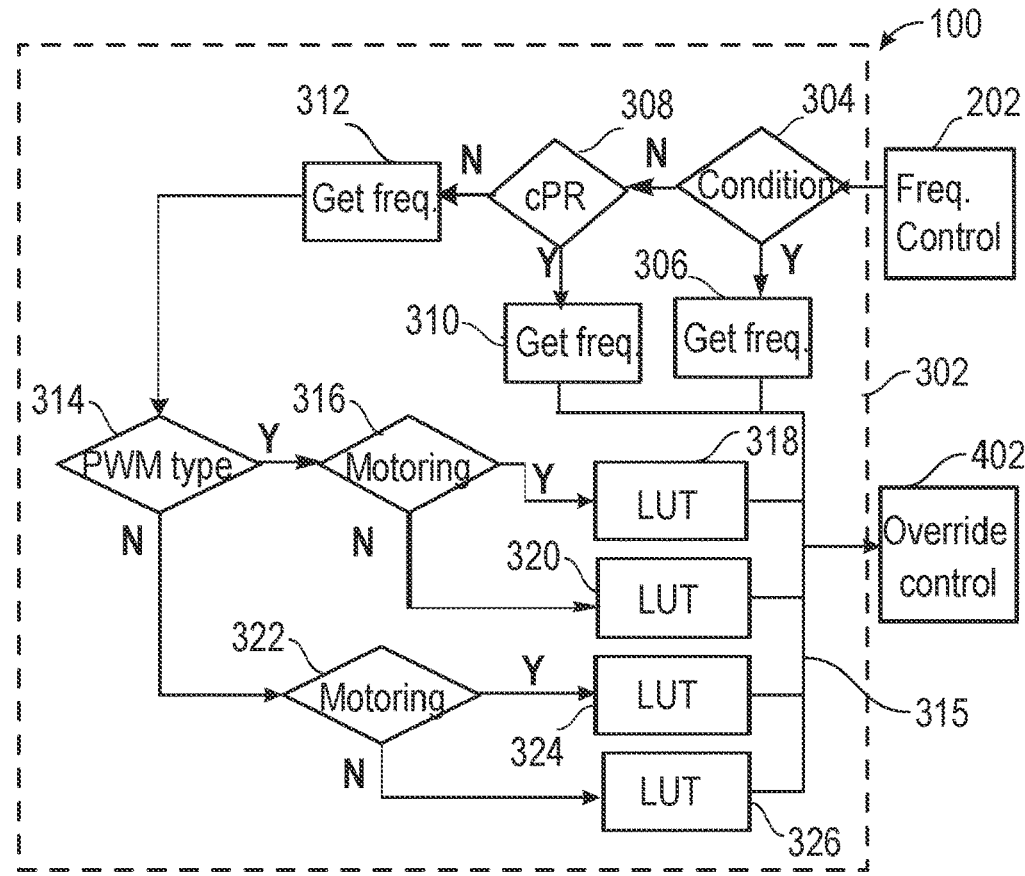
FIG. 5 is a flowchart showing in detail another portion of the method of FIG. 3.

Module 302 is shown in detail in FIG. 5. Module 302 includes selecting a PWM switching frequency style. By way of non-limiting examples, FIG. 8C illustrates three PWM switching frequency styles: a constant pulse ratio (cPR) switching style, a constant switching frequency (cFsw) switching style, and a lookup table (LUT) with an array of selectable switching frequencies associated with various inputs, such as motor speed and/or torque. Similar to the PWM types of FIG. 8B, each of the PWM regions of FIG. 8A is assigned to one of the available PWM switching frequency styles of FIG. 8C. Additionally, PWM region six (6) may be selected from the PWM region layout of FIG. 8A; as seen in FIG. 8C, PWM region six (6) is assigned to execute a cFsw switching style. It is understood that method 100 of FIG. 3 may employ greater or fewer than three switching styles, which may include additional or alternative available styles.

Referring now to FIG. 5, module 302 begins with decision block 304 for assessing whether or not the PWM switching frequency style corresponding to the selected PWM region and present operating mode of the motor is a constant switching frequency switching style ("cFsw"). If it is (block 304=YES), module 302 proceeds to process block 306 to determine a desired switching frequency based on a lookup table for cFsw and advances to module 402 via line 315. If it is not (block 304=NO), the method 100 proceeds to decision block 308 to determine whether the PWM switching frequency style corresponding to the selected PWM torque-speed region and present operating mode of the motor is a constant pulse ratio switching style ("cPR"). If it is (block 308=YES), module 302 proceeds to process block 310 to determine a desired switching frequency based on a lookup table for cPR and advances to module 402 via line 315. Referring to FIG. 5, if the PWM switching frequency style is neither a cPR nor a cFsw switching style (block 308=NO), module 302 of FIG. 5 advances to process blocks 312 to 326 to determining a desired PWM switching frequency, prior to advancing to module 402 via line 315.

The switching frequency is retrieved from one of multiple tables based on a combination of the following parameters: the PWM Type (e.g., DPWM/ZVM versus SVPWM); operating mode (e.g., motoring versus regenerative); and the magnitude of the inverter voltage (for example, relative to a high, mid, low, mid-low and mid-high threshold). Per decision block 314 of FIG. 5, the controller C is programmed to determine if (1) the PWM Type is DPWM/ZVM; and (2) the selected PWM Type is SVPWM. If so (block 314=YES), the method 100 proceeds to decision block 316 to ascertain whether the operating mode is motoring (versus regenerative). If not (block 314=NO), the method 100 proceeds to decision block 322.

If the mode is motoring (block 316=YES), the method 100 proceeds to process block 318. If the mode is regenerative (block 316=NO), the method 100 proceeds to process block 320. Similarly, decision block 322 is executed to ascertain whether the operating mode is motoring (versus regenerative) and proceeds to process block 324 (block 322=YES) and process block 326 (block 322=NO).

The process blocks 318, 320, 324 and 326 each incorporate a plurality of look-up tables (LUT) based on the magnitude of the inverter DC bus voltage, referred to herein as inverter voltage ($V_{dc}$). In one example, each of the process blocks 318, 320, 324 and 326 include five respective tables, as follows: (1) if $V_{dc}$ is at or above a high threshold, a respective high table is used; (2) if $V_{dc}$ is at or below a low threshold, a respective low table is used; (3) if $V_{dc}$ is at or between a mid-low and a mid-high threshold, a respective mid table is used); (4) if $V_{dc}$ is between the mid-low threshold and the low threshold, a linear interpolation between the respective mid and low tables is performed; and (5) if $V_{dc}$ is between the mid-high threshold and the high threshold, a linear interpolation between the respective mid and high tables is performed. As a non-limiting example (which may change from one vehicle model to another), the low threshold, mid-low threshold, mid-high threshold and high threshold voltages may be 250V, 300V, 350V and 400V, respectively. It is understood that the stratification of the magnitude of the inverter voltage ($V_{dc}$) may be varied based on the application. For example, instead of the five categories described above with 20 look-up tables, the method 100 may include ten narrower categories that are embodied by 40 look-up tables. Referring to FIG. 5, method 100 transitions from process blocks 318, 320, 324 and 326 to module 402, via line 315.

Figure 8D:
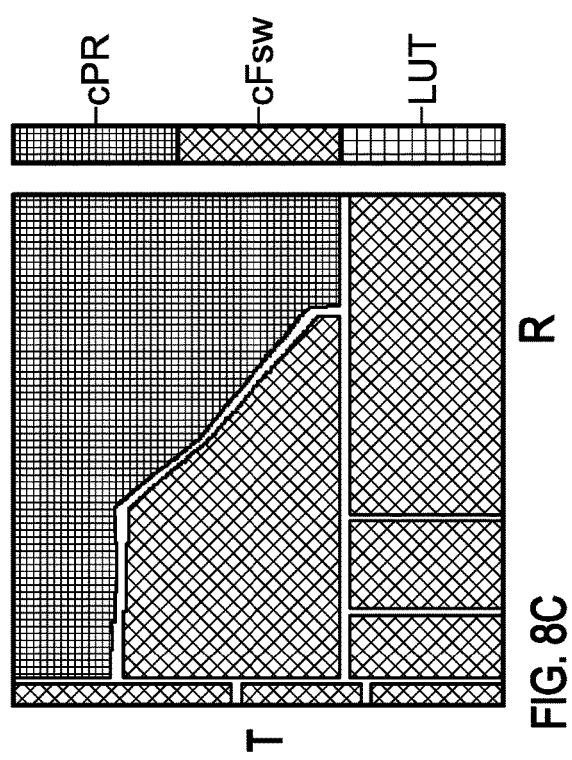

It may be desirable to combine PWM-type and PWM-switching frequency selection to optimize the performance and range of the electric vehicle 14, and reduce noise. By way of a non-limiting example, a switching frequency ($F_{SW}$) of 2 kHz may be combined with a ZVM technique for use at low motor speeds and high torque demands, e.g., to enable a rock-climbing maneuver for an electrified sport utility vehicle (SUV), ATV, or industrial vehicle and to reduce thermal wear on the inverter and electrical units. In contrast, FIG. 8D shows that a switching frequency of 10 kHz may be combined with either a SVPWM or DPWM technique for low motor speeds and low motor torques, e.g., to reduce powertrain NVH. A DPWM technique may be combined with a switching frequency of 10 kHz, 15 kHz, and 20 kHz for use at low torque and low, medium, and high speeds, respectively, to increase EV range. In another example, a switching frequency of 10 kHz may be combined with SVPWM technique for use at mid-range torques for NVH reduction. A DPWM technique may be combined with a constant pulse ratio switching style to achieve higher torque or acceleration for both performance and to manage thermal load.

Referring now FIG. 3, module 402 pertains to an override of the control reference frequency during a six-step operation. As understood by those skilled in the art, a six-step operation is a mode of operation wherein the voltage vector is applied at six intervals (for a three-phase inverter) during one fundamental cycle (i.e., electrical speed). Because the six-step operation is not connected to PWM switching, a higher control reference frequency will generally provide better control. Module 402 begins with decision block 404, where the controller C is configured to ascertain whether or not the six-step operation is in place or active. If so (block 404=YES), method 100 proceeds to process block 406 where the control reference frequency determined thus far in the preceding modules is overridden or disregarded and a distinct six step reference frequency is set as the current control reference frequency. This ensures optimal control independent of the current operation when transitioning to six step operation. If not (block 404=NO), module 402 transitions to module 502.

Module 502 is shown in detail in FIG. 3 and pertains to a second set of frequency limitations or controls. Module 502 begins with decision block 504 where it is determined whether (1) the PWM type is SVPWM; and (2) the current switching frequency ($F_{SW}$) is greater than a threshold SVPWM switching frequency. If so (block 504=YES), method 100 proceeds to process block 506 where the current switching frequency ($F_{SW}$) is set to the threshold SVPWM switching frequency. If not (block 504=NO), method 100 proceeds to decision block 508 to determine whether or not the current switching frequency ($F_{SW}$) is greater than a predefined maximum switching frequency (max $F_{SW}$). If so (block 508=YES), the method 100 proceeds to process block 512, to set or clamp the current switching frequency ($F_{SW}$) to the predefined maximum switching frequency (max $F_{SW}$). If not (block 508=NO), the method 100 proceeds to process block 510 to ascertain whether or not the current switching frequency ($F_{SW}$) is less than a predefined minimum switching frequency (min $F_{SW}$). If so (block 510=YES), the module 502 proceeds to process block 514 to set or clamp the current switching frequency ($F_{SW}$) to the predefined minimum switching frequency (min $F_{SW}$). If not (block 510=NO), method 100 proceeds to module 602.

The predefined thresholds described herein may be obtained through calibration in a controlled setting. The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model.

Figure 6:
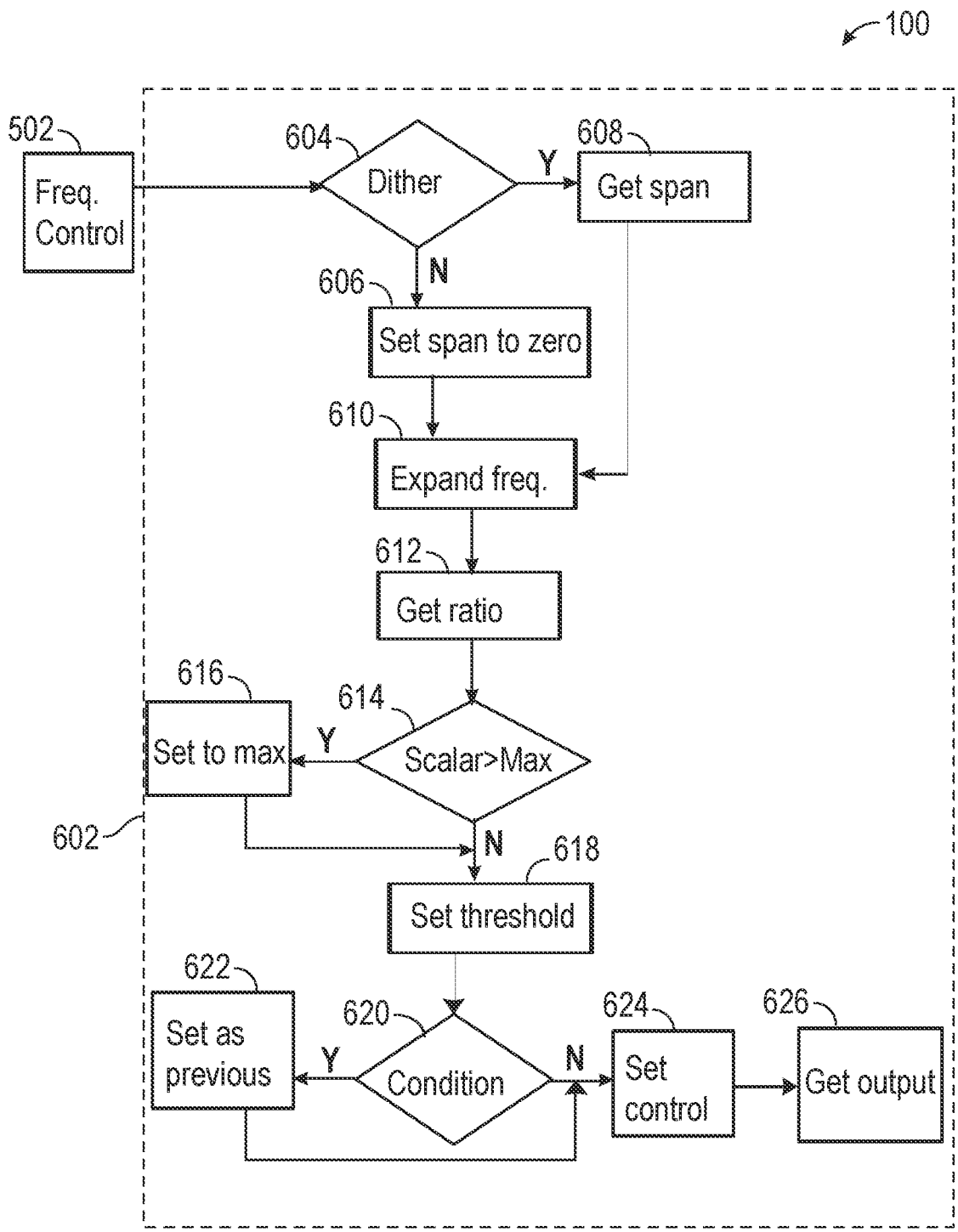
FIG. 6 is a flowchart showing in detail yet another portion of the method of FIG. 3.

Module 602 is shown in greater detail in FIG. 6. Referring to FIG. 6, module 602 executes decision block 604 to ascertain whether or not a dither function is enabled. If so (block 604=YES), the method 100 proceeds to process block 608 where a switching frequency span (FswSpan) pertaining to the dither function is calculated. For example, the frequency span may be 2 percent of the switching frequency. If not (block 604=NO), the method 100 proceeds to process block 606 where the switching frequency span (FswSpan=0) is set to zero.

The method 100 proceeds from process blocks 606 and 608 to process block 610 where a temporary (or "expanded") switching frequency is set as the sum of the current switching frequency and half the switching frequency span as follows:

$$\text{Expanded } F_{SW} = (\text{Intermediate } F_{SW} + \tfrac{1}{2} F_{SW} \text{DitherSpan}).$$

In other words, the expanded switching frequency incorporates the dither switching frequency span. From process block 610, the method 100 proceeds to process block 612.

In process block 612, the controller C is programmed to determine the PWM scalar as follows: (1) obtaining a ratio of the expanded switching frequency divided by a maximum value of the control reference frequency; and (2) obtaining the least integer greater than or equal to this ratio (e.g., rounding up). For example, the PWM scalar may be obtained through the CEILING function as: PWM scalar=CEILING [Ratio]; Ratio=(Expanded $F_{SW}$/Maximum Reference Frequency). For example, if the ratio is 5.3. The rounded-up value as described above [CEILING (5.3)] would be 6. The method 100 proceeds to decision block 614. The maximum reference frequency is constrained by the microprocessor speed and the controls and throughput requirements of the electric drive system 10.

Per decision block 614, the method 100 ascertains whether the PWM scalar is greater than a predefined maximum scalar value. If so (Block 614=YES), the method 100 proceeds to process block 616 where the PWM scalar is set to be the predefined maximum scalar value. Process block 616 then proceeds to process block 618. If not (Block 614=NO), the method 100 proceeds to process block 618 where the controller C is programmed to first set a High Threshold Frequency as follows:

$$\text{High Threshold Frequency} = \text{PWM Scalar} * \text{Maximum Reference Frequency}$$

From process block, 618, the method 100 proceeds to decision block 620 of FIG. 6. Per decision block 620, the controller C determines if (1) a previous PWM scalar (from the previous iteration) is greater than the PWM scalar (from the current iteration); (2) the expanded switching frequency (Expanded $F_{SW}$) is within a predefined hysteresis band; and (3) the expanded switching frequency (Expanded $F_{SW}$) is less than or equal to the High Threshold Frequency.

The technical advantage of employing a hysteresis band is to reduce toggle between various values of the PWM scalar. In a non-limiting example, the maximum reference frequency of an electric drive system 10 may be 10,000 Hz and the hysteresis band may be 100 Hz (9900 Hz to 10,000 Hz). Thus, if the change in switching frequency is within the hysteresis band, the previous PWM scalar is retained in order to avoid toggling. The new calculated PWM scalar is adopted when the change in switching frequency exceeds the hysteresis band. The hysteresis band provides an instantaneous feedback control method where the deviations from the hysteresis band are continually tracked.

If so (block 620=YES), the method 100 of FIG. 6 proceeds to process block 622, where the PWM scalar (from the current iteration) is set as the previous PWM scalar (from the previous iteration). The method 100 proceeds from process block 622 to process block 624. If not (block 620=NO), the method 100 proceeds directly to process block 624. In process block 624, the previous PWM scalar is set as the PWM scalar and the control reference frequency is set as the current switching frequency divided by the PWM scalar, as follows:

$$\text{Control Reference Frequency} = (\text{Current } F_{SW}/\text{PWM Scalar}).$$

From process block 624 of FIG. 6, the method 100 proceeds to process block 626, where the following parameters are outputted: the control reference frequency, the PWM scalar and the current switching frequency. Instead of control reference frequency, a control reference period as (PWM Scalar/Current $F_{SW}$) may be outputted. Module 602 of FIG. 6 ends at process block 626. The method 100 may be dynamically executed to obtain a PWM scalar that is dynamic. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The controller C is programmed to transmit a command signal to the power inverter 22 to regulate a transfer of electrical power between the rechargeable energy storage unit 20 and the electric motor 24 based in part on the PWM scalar.

In summary, the electric drive system 10 increases the operable range of the PWM switching frequency, by implementing a PWM scalar, thereby improving the range and functioning of the electric vehicle 14. The control reference frequency and the PWM switching frequency are decoupled as a result. The electric drive system 10 may reduce noise and vibration by pushing the PWM switching frequency outside the audible range. Additionally, the controller C may be programmed to enable a switching frequency dead band as a function of current and inverter DC bus voltage, to avoid resonance at relatively high currents. As understood by those skilled in the art, dead band refers to discontinuities introduced intentionally into the reference waveform, for better performance. For example, the PWM switching frequency may be reduced by avoiding intersection of the reference modulation wave and carrier wave for a frequency range. For example, if the switching frequencies are between 2 k and 20 kHz, and the dead band is at 12-14 kHz, the operable frequencies would be 2-12 kHz and 14-20 kHz.

The controller C of FIG. 1 may be an integral portion of, or a separate module operatively connected to, other controllers of the device 12. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts in FIGS. 3-6 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric drive system comprising:
a rechargeable energy storage unit and a power inverter operatively connected to the rechargeable energy storage unit;
an electric motor operatively connected to the power inverter;
a controller in communication with the power inverter, operation of the controller being at least partially defined by a control reference frequency;

wherein a transfer of electrical power between the rechargeable energy storage unit and the electric motor is governed by a pulse width modulation (PWM) switching frequency;

wherein the controller has a processor and tangible, non-transitory memory on which instructions are recorded, execution of the instructions by the processor causing the controller to:

determine a current switching frequency based in part on a PWM type, a PWM switching frequency style and an inverter direct current voltage;

obtain a PWM scalar based in part on the current switching frequency and a maximum value of the control reference frequency; and transmit a command signal to the power inverter to regulate the transfer of electrical power based in part on the PWM scalar, the PWM switching frequency being proportional to a product of the PWM scalar and the control reference frequency.

2. The electric drive system of claim 1, wherein:

the current switching frequency is based in part on an inverter coolant temperature and whether a motoring torque or a regenerative torque is in operation; and the instructions are executed dynamically such that the PWM scalar varies over time.

3. The electric drive system of claim 1, wherein obtaining the PWM scalar includes:

obtaining an expanded PWM switching frequency as a sum of the current switching frequency and a frequency span;

obtaining a ratio of the expanded PWM switching frequency divided by the maximum value of the control reference frequency; and setting the PWM scalar as a smallest integer greater than or equal to the ratio such that the PWM scalar equals CEILING (Ratio).

4. The electric drive system of claim 1, wherein determining the current switching frequency includes:

determining a PWM region layout having multiple PWM regions arranged in a torque-speed curve calibrated to the electric motor, via the controller; and obtaining a designated PWM region from the PWM region layout in the torque-speed curve, based on a speed and a torque of the electric motor, via the controller, the speed and the torque of the electric motor being based in part on a torque command.

5. The electric drive system of claim 4, wherein determining the current switching frequency includes:

selecting the PWM type as a function of the designated PWM region, via the controller; and selecting the PWM switching frequency style as a function of the designated PWM region, via the controller.

6. The electric drive system of claim 5, wherein:

the PWM switching frequency style is selected from a predefined list of PWM switching frequency styles, the predefined list of PWM switching frequency styles including a constant pulse ratio switching style a constant switching frequency switching style and a lookup table (LUT) with an array of selectable switching frequencies.

7. The electric drive system of claim 1, wherein:

the PWM type is selected from a predefined list of PWM types, the predefined list of PWM types including a discontinuous PWM (DPWM) technique, a zero-vector modulation (ZVM) technique, and a space vector pulse width modulation (SVPWM) technique.

8. The electric drive system of claim 1, wherein:

when the PWM type is a space vector pulse width modulation (SVPWM) technique and the current switching frequency is greater than a threshold SVPWM switching frequency, the controller is programmed to set the current switching frequency to the threshold SVPWM switching frequency prior to updating the PWM type to the SVPWM technique.

9. The electric drive system of claim 1, wherein:

when the PWM type is a discontinuous PWM (DPWM) technique, the controller is programmed to prevent switching from the DPWM technique to a space vector pulse width modulation (SVPWM) technique until the current switching frequency is below a threshold SVPWM switching frequency.

10. The electric drive system of claim 1, wherein:

the controller is programmed to override the control reference frequency and the PWM switching frequency when a six-step operation is active.

11. The electric drive system of claim 10, wherein:

the controller is programmed to incorporate a hysteresis band at a maximum value of the control reference frequency.

12. A method of operating an electric drive system having a rechargeable energy storage unit, an electric motor, a power inverter, and a controller with a processor and tangible, non-transitory memory, the method comprising:

regulating a transfer of electrical power between the rechargeable energy storage unit and the electric motor by a pulse width modulation (PWM) switching frequency, via the power inverter;

determining a current switching frequency based in part on a PWM type, a PWM switching frequency style and an inverter direct current voltage, via the controller, operation of the controller being at least partially defined by a control reference frequency;

obtaining a PWM scalar based in part on the current switching frequency and a maximum value of the control reference frequency, via the controller; and transmitting a command signal to the power inverter to regulate the transfer of electrical power based in part on the PWM scalar, the PWM switching frequency being proportional to a product of the PWM scalar and the control reference frequency, via the controller.

13. The method of claim 12, wherein obtaining the PWM scalar includes:

obtaining an expanded PWM switching frequency as a sum of the current switching frequency and a dither frequency span;

obtaining a ratio of the expanded PWM switching frequency divided by a maximum value of the control reference frequency; and obtaining the PWM scalar based in part on the ratio.

14. The method of claim 13, wherein obtaining the PWM scalar includes:

setting the PWM scalar as a smallest integer greater than or equal to the ratio such that the PWM scalar equals a CEILING function of the ratio.

15. The method of claim 12, wherein obtaining the current switching frequency includes:

selecting the PWM type from a predefined list of PWM types, including a discontinuous PWM (DPWM) technique, a zero-vector modulation (ZVM) technique, and a space vector pulse width modulation (SVPWM) technique; and when the PWM type is the SVPWM technique and the current switching frequency is greater than a threshold SVPWM switching frequency, setting the current switching frequency as the threshold SVPWM switching frequency prior to transmitting the command signal to the power inverter.

16. The method of claim 15, when the PWM type is the DPWM technique, further comprising:
preventing switching from the DPWM technique to the SVPWM technique until the current switching frequency is below a predefined threshold.

17. The method of claim 12, further comprising:
applying a hysteresis band to the current switching frequency, the hysteresis band extending to a maximum value of the control reference frequency.

18. An electric vehicle comprising:
a traction motor adapted to output torque for propulsion;
a traction battery pack adapted to power the traction motor;
a power inverter electrically connecting the traction battery pack to the traction motor;
a controller in communication with the power inverter, operation of the controller being defined by a control reference frequency;
wherein the power inverter is operable to convert direct current power output by the traction battery pack to alternative current power and transfer the alternative current power to the traction motor, based in part on a pulse width modulation (PWM) switching frequency;
wherein the controller has a processor and tangible, non-transitory memory on which instructions are recorded, execution of the instructions by the processor causing the controller to:
determine a current switching frequency based in part on a PWM type, a PWM switching frequency style and an inverter direct current voltage;
obtain a PWM scalar based in part on the current switching frequency and a maximum value of the control reference frequency; and
transmit a command signal to the power inverter to regulate a transfer of electrical power based in part on the PWM scalar, the PWM switching frequency being proportional to a product of the PWM scalar and the control reference frequency.

19. The electric vehicle of claim 18, wherein obtaining the PWM scalar includes:
obtaining an expanded PWM switching frequency as a sum of the current switching frequency and a dither frequency span;
obtaining a ratio of the expanded PWM switching frequency divided by a maximum value of the control reference frequency; and
obtaining the PWM scalar based in part on the ratio.

20. The electric vehicle of claim 19, wherein obtaining the PWM scalar includes:
setting the PWM scalar as a smallest integer greater than or equal to the ratio such that the PWM scalar equals a CEILING function of the ratio.

* * * * *